United States Patent
Kande et al.

(10) Patent No.: US 11,159,435 B2
(45) Date of Patent: Oct. 26, 2021

(54) TIME-SENSITIVE NETWORKING FOR INDUSTRIAL AUTOMATION

(71) Applicant: ABB Schweiz AG, Baden (CH)

(72) Inventors: Mallikarjun Kande, Solon, OH (US); Marco Sanguineti, Genoa (IT); Lissy Pellaco, Genoa (IT)

(73) Assignee: ABB Schweiz AG, Baden (CH)

( * ) Notice: Subject to any disclaimer, the term of this patent is extended or adjusted under 35 U.S.C. 154(b) by 112 days.

(21) Appl. No.: 16/676,965

(22) Filed: Nov. 7, 2019

(65) Prior Publication Data
US 2021/0144098 A1 May 13, 2021

(51) Int. Cl.
| | |
|---|---|
| *H04L 12/841* | (2013.01) |
| *G05B 19/418* | (2006.01) |
| *H04L 12/751* | (2013.01) |
| *H04L 12/707* | (2013.01) |
| *H04L 12/851* | (2013.01) |

(52) U.S. Cl.
CPC .......... *H04L 47/28* (2013.01); *G05B 19/4185* (2013.01); *H04L 45/02* (2013.01); *H04L 45/22* (2013.01); *H04L 47/24* (2013.01)

(58) Field of Classification Search
CPC ......... H04L 47/28; H04L 45/02; H04L 45/22; H04L 47/24; G05B 19/4185
See application file for complete search history.

(56) References Cited

U.S. PATENT DOCUMENTS

| | | | |
|---|---|---|---|
| 6,286,038 B1 | 9/2001 | Reichmeyer et al. | |
| 10,182,015 B2* | 1/2019 | Heine | H04L 47/24 |
| 2007/0223533 A1 | 9/2007 | Kirrmann et al. | |
| 2016/0197820 A1* | 7/2016 | Gotz | H04L 45/1283 |
| | | | 370/236 |
| 2017/0163744 A1 | 6/2017 | Lida et al. | |
| 2017/0272366 A1 | 9/2017 | Bush et al. | |
| 2018/0026876 A1* | 1/2018 | Steindl | H04L 12/4645 |
| | | | 370/392 |
| 2019/0042378 A1 | 2/2019 | Wouhaybi et al. | |
| 2019/0123933 A1* | 4/2019 | Mueller | H04L 49/00 |

FOREIGN PATENT DOCUMENTS

| | | |
|---|---|---|
| CN | 102394787 B | 9/2015 |
| CN | 103336425 B | 2/2016 |
| CN | 105556407 A | 5/2016 |
| CN | 105573193 A | 5/2016 |
| CN | 103647781 B | 5/2017 |

(Continued)

*Primary Examiner* — Donald L Mills
(74) *Attorney, Agent, or Firm* — Leydig, Voit & Mayer, Ltd.

(57) ABSTRACT

Systems, methods, techniques and apparatuses of industrial automation are disclosed. One exemplary embodiment is an industrial automation system including a primary time-sensitive network (TSN) and a redundant TSN. The system also includes a control system configured to determine a primary data flow, determine a redundant data flow duplicative of the primary data flow, and generate a plurality of sets of configuration information using the primary data flow and the redundant data flow. The primary TSN and the redundant TSN, using the plurality of sets of configuration information, are configured to transmit the primary data flow and the redundant data flow simultaneously.

20 Claims, 3 Drawing Sheets

(56) References Cited

FOREIGN PATENT DOCUMENTS

| WO | 2007101087 A2 | 9/2007 |
| WO | 2015171303 A1 | 11/2015 |
| WO | 2017028932 A1 | 2/2017 |
| WO | 2017093014 A1 | 6/2017 |
| WO | 2017137075 | 8/2017 |
| WO | 2019130048 | 7/2019 |

* cited by examiner

TIME-SENSITIVE NETWORKING FOR INDUSTRIAL AUTOMATION

BACKGROUND

The present disclosure relates generally to communication networks in industrial automation. Minimizing message latency is important for real-time control in industrial automation. Implementing a time-sensitive network in an industrial automation systems would allow the automation system to communicate with deterministic traffic flow. Existing time-sensitive networks suffer from a number of shortcomings and disadvantages. There remain unmet needs including reducing the effects of network faults on message delivery. For instance, a time-sensitive network switch failure in a time-sensitive network may disrupt the delivery of critical control messages in an industrial automation system. In view of these and other shortcomings in the art, there is a significant need for the unique apparatuses, methods, systems and techniques disclosed herein.

DISCLOSURE OF ILLUSTRATIVE EMBODIMENTS

For the purposes of clearly, concisely and exactly describing non-limiting exemplary embodiments of the disclosure, the manner and process of making and using the same, and to enable the practice, making and use of the same, reference will now be made to certain exemplary embodiments, including those illustrated in the figures, and specific language will be used to describe the same. It shall nevertheless be understood that no limitation of the scope of the present disclosure is thereby created, and that the present disclosure includes and protects such alterations, modifications, and further applications of the exemplary embodiments as would occur to one skilled in the art with the benefit of the present disclosure.

SUMMARY OF THE DISCLOSURE

Exemplary embodiments of the disclosure include unique systems, methods, techniques and apparatuses for industrial automation systems. Further embodiments, forms, objects, features, advantages, aspects and benefits of the disclosure shall become apparent from the following description and drawings.

DETAILED DESCRIPTION OF ILLUSTRATIVE EMBODIMENTS

Figure 1:
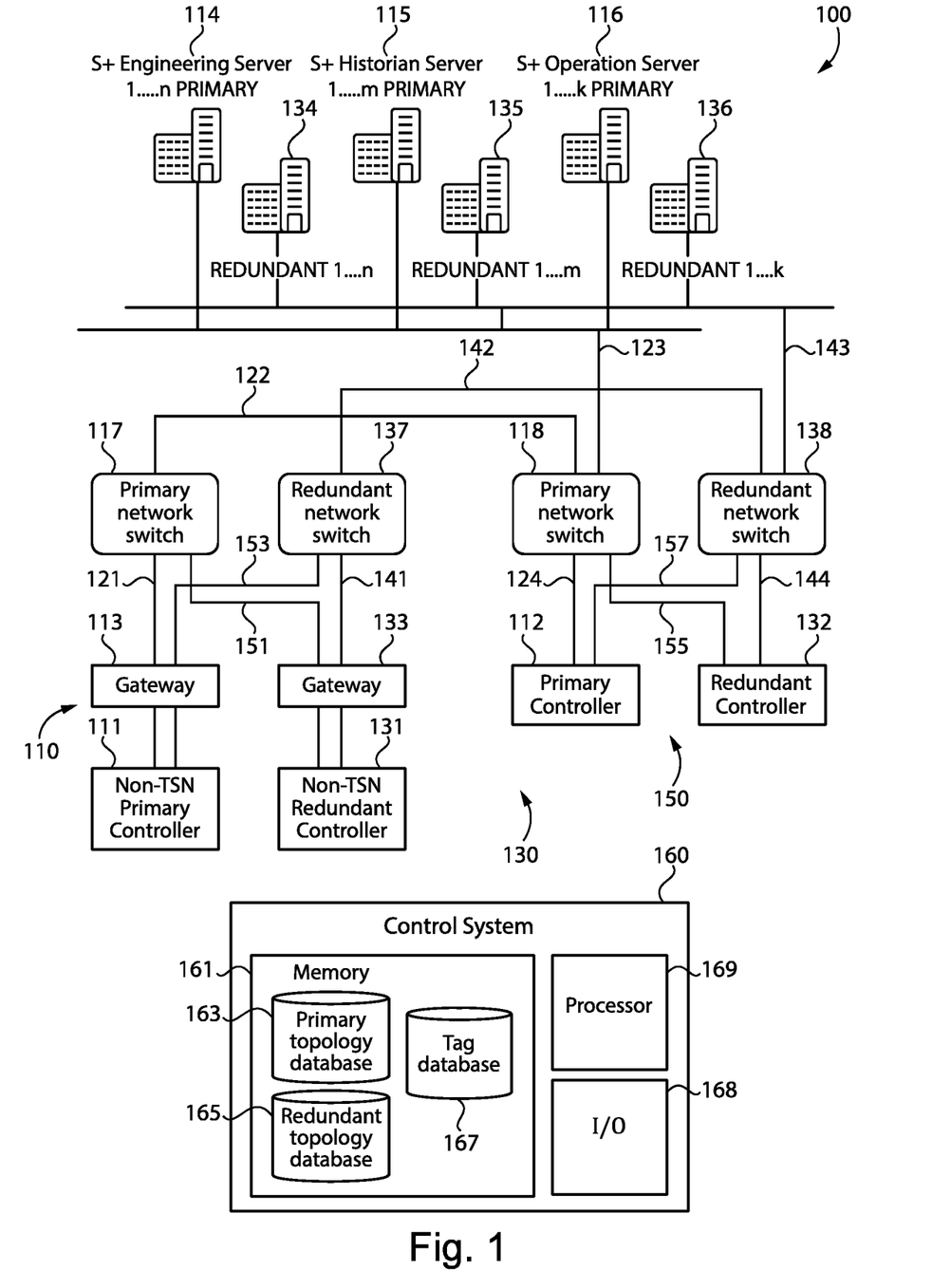
FIG. 1 illustrates an exemplary industrial automation system.

With reference to FIG. 1, there is illustrated an exemplary industrial automation system 100. It shall be appreciated that system 100 may be implemented in a variety of applications, including assembly lines and other manufacturing systems, to name but a few examples. It shall be appreciated that the topology of system 100 is illustrated for the purpose of explanation and is not intended as a limitation of the present disclosure.

System 100 includes a primary time-sensitive network (TSN) 110, a redundant TSN 130, and a plurality of inter-network communication channels 150. Each network is time-sensitive and structured to transmit packets between end nodes in a deterministic manner. Each packet includes an identifier that is used by a configured node to determine how to process the packet. In certain embodiments, each time-sensitive network is a network constructed and operated in accordance with IEEE standards under 802.1Q, Open Platform Communications (OPC), or IEC/IEEE standards under 60802, to name but a few examples. Each time sensitive network of system 100 is structured to deliver packets to an intended destination end node at a time known by both the destination end node and the source end node. The known time may include a narrow time frame, i.e. within 1% of an expected time, to name but one example. If packets are delivered outside the time frame, the packet transmission is considered a delivery failure. Time sensitive end nodes and network nodes of system 100 operate while synchronized to a common time.

Primary TSN 110 includes a plurality of end nodes, a plurality of network nodes, and a plurality of communication channels. The plurality of end nodes includes non-TSN controller 111, controller 112, server 114, server 115, and server 116. The plurality of end nodes are structured to transmit data to other end nodes of system 100 using the plurality of network nodes. Each server may be structured to configure the nodes of system 100, monitor system 100, and store historical operation data for system 100. The plurality of end nodes may include any type of time-sensitive device structured to transmit or receive data in an industrial automation system, such as a controller or a sensor, to name but a few examples. The plurality of network nodes includes network switch 117, network switch 118, and gateway 113. The plurality of network nodes are time-sensitive network nodes structured to transfer data packets using time-sensitive traffic flows between the plurality of end nodes. Gateway 113 is structured to allow non-TSN controller 111 to establish time-sensitive traffic flows with other end nodes of the plurality of end nodes. A non-TSN controller may be a legacy controller structured to detect information types, time awareness, and synchronize using a common time. The plurality of network nodes may include any type of device structured to transfer data using time-sensitive traffic flows.

Each communication channel of system 100 is structured to allow communication between an end node and a network node or between two network nodes. The plurality of communication channels includes communication channel 121 between network switch 117 and gateway 113; communication channel 122 between network switch 117 and network switch 118; communication channel 123 between network switch 118 and servers 114, 115, and 116; and communication channel 124 between primary controller 112 and network switch 118.

Redundant TSN 130 includes a plurality of end nodes, a plurality of network nodes, and a plurality of communication channels. The plurality of end nodes includes non-TSN controller 131, controller 132, server 134, server 135, and server 136. The plurality of end nodes are structured to transmit data to other end nodes of system 100 using the plurality of network nodes. The plurality of end nodes may include any type of device structured to transmit or receive data in an industrial automation system. The plurality of network nodes includes network switch 137, network switch 138, and gateway 133. The plurality of network nodes are time-sensitive network nodes structured to transfer data packets using time-sensitive traffic flows. Gateway 133 is structured to allow non-TSN controller 131 to establish time-sensitive traffic flows with other end nodes of the plurality of end nodes. The plurality of network nodes may include any type of device structured to transfer data using time-sensitive traffic flows.

The plurality of communication channels includes communication channel 141 between network switch 137 and gateway 133; communication channel 142 between network switch 137 and network switch 138; communication channel 143 between network switch 138 and servers 134, 135, and 136; and communication channel 144 between redundant controller 132 and network switch 138.

As described in more detail below, the nodes of redundant TSN 130 are duplicative of the nodes of primary TSN 110 and may be configured to replicate the same functions as the nodes of primary TSN 110. From a physical standpoint, redundant TSN 130 duplicates all the nodes of primary TSN 110: controller 131 is duplicative of controller 111; controller 132 is duplicative of controller 112; gateway 133 is duplicative of gateway 113; network switch 137 is duplicative of network switch 117; network switch 138 is duplicative of network switch 118; server 134 is duplicative of server 114; server 135 is duplicative of server 115; and server 136 is duplicative of server 116. In this way, primary and redundant TSNs for an industrial automation system are deployed.

From a logical standpoint, the connections between the end nodes in the primary TSN 110 and the redundant TSN 130 are the same, even though different routes in the physical layer connect the end nodes or different routes are taken by the packets in the deployed primary and redundant TSNs.

In the illustrated embodiment, system 100 includes a plurality of inter-network communication channels 150. Each communication channel of the plurality of inter-network communication channels 150 is structured to allow communication between an end node of one TSN and a network node of the other TSN. The plurality of inter-network communication channels 150 includes communication channel 151 between network switch 117 and gateway 133; communication channel 153 between network switch 137 and gateway 113; communication channel 155 between controller 132 and network switch 118; and communication channel 157 between network switch 138 and controller 112. In certain embodiments, system 100 may include additional inter-network communication channels between network nodes of system 100. In certain embodiments, the communication channels of system 100 include parallel communication channels. In other embodiments, system 100 does not include the plurality of inter-network communication channels 150 such that primary TSN 110 and redundant TSN 130 operate independently.

System 100 includes a network control system 160 structured to generate a set of configuration information for each node of system 100 for feasible data exchange using networks 110 and 130. Control system 160 configures each node such that duplicative packets are transmitted simultaneously. When a failure occurs between an end node and network node of one TSN, control system 160 may reconfigure the end node to transmit packets through the duplicative TSN. Where a failure occurs in system 100, such between two network nodes of the same TSN to give but one example, control system 160 may reconfigure a portion of the duplicative TSN to transmit packets of an affected data flow. The cause of a failure may be a malfunctioning node, incorrect information transmitted between nodes, incorrect network configuration information transmitted to a node, failure of end node to receive a transmission, or any unexpected change in the current network topology, to name but a few examples. A failure may also occur between an end node and a network node, or between two network nodes of different TSNs, to name but a few examples.

Network control system 160 includes an input/output device 168, a processing device 169, and a memory device 161. Control system 160 may be a stand-alone device, an embedded system, or a plurality of devices structured to perform the functions described with respect to control system 160. Control system 160 may be incorporated into one of the engineering servers of primary TSN 110. For example, control system 160 may be a primary engineering server of system 100 structured to execute a configuration tool or engineering tool effective to perform the functions described herein, to name but one example.

Input/output device 168 enables control system 160 to communicate with the plurality of end nodes and the plurality of network nodes. Input/output device 168 may include a network adapter, network credential, interface, or a port (e.g., a USB port, serial port, parallel port, an analog port, a digital port, VGA, DVI, HDMI, FireWire, CAT 5, Ethernet, fiber, or any other type of port or interface), to name but a few examples. Input/output device 168 may be comprised of hardware, software, and/or firmware. It is contemplated that input/output device 168 includes more than one of these adapters, credentials, or ports, such as a first port for receiving data and a second port for transmitting data.

Processing device 169 is structured to execute applications stored on memory device 161. Processing device 169 may be a programmable type, a dedicated, hardwired state machine, or a combination thereof. Processing device 169 may include multiple processors, Arithmetic-Logic Units (ALUs), Central Processing Units (CPUs), Digital Signal Processors (DSPs), or a Field-programmable Gate Array (FPGA), to name but a few examples. For forms of processing device 169 with multiple processing units, distributed, pipelined, or parallel processing may be used. Processing device 169 may be dedicated to performance of just the operations described herein or may be used in one or more additional applications. In the illustrated form, processing device 169 is of a programmable variety that executes processes and processes data in accordance with applications including sets of instructions stored in memory device 161. Alternatively or additionally, programming instructions are at least partially defined by hardwired logic or other hardware. Processing device 169 may be comprised of one or more components of any type suitable to process the signals received from input/output device 168 or elsewhere, and provide output signals. Such components may include digital circuitry, analog circuitry, or a combination of both.

Memory device 161 is structured to store data and instructions executable by processing device 169. The data stored on memory device 161 includes a primary topology database 163, a redundant topology database 165, and a tag database 167, as well as other types of data stores. Memory device 161 may be of one or more types, such as a solid-state variety, electromagnetic variety, optical variety, or a combination of these forms, to name but a few examples. Furthermore, memory device 161 may be volatile, nonvolatile, transitory, non-transitory, or a combination of these types, and some or all of memory device 161 may be of a portable variety, such as a disk, tape, memory stick, or cartridge, to name but a few examples.

While the embodiments described hereinafter may not specifically describe features analogous to the features of system 100, such features may nonetheless be employed in connection with the described networks, control systems, and industrial automation systems described below.

Figure 2:
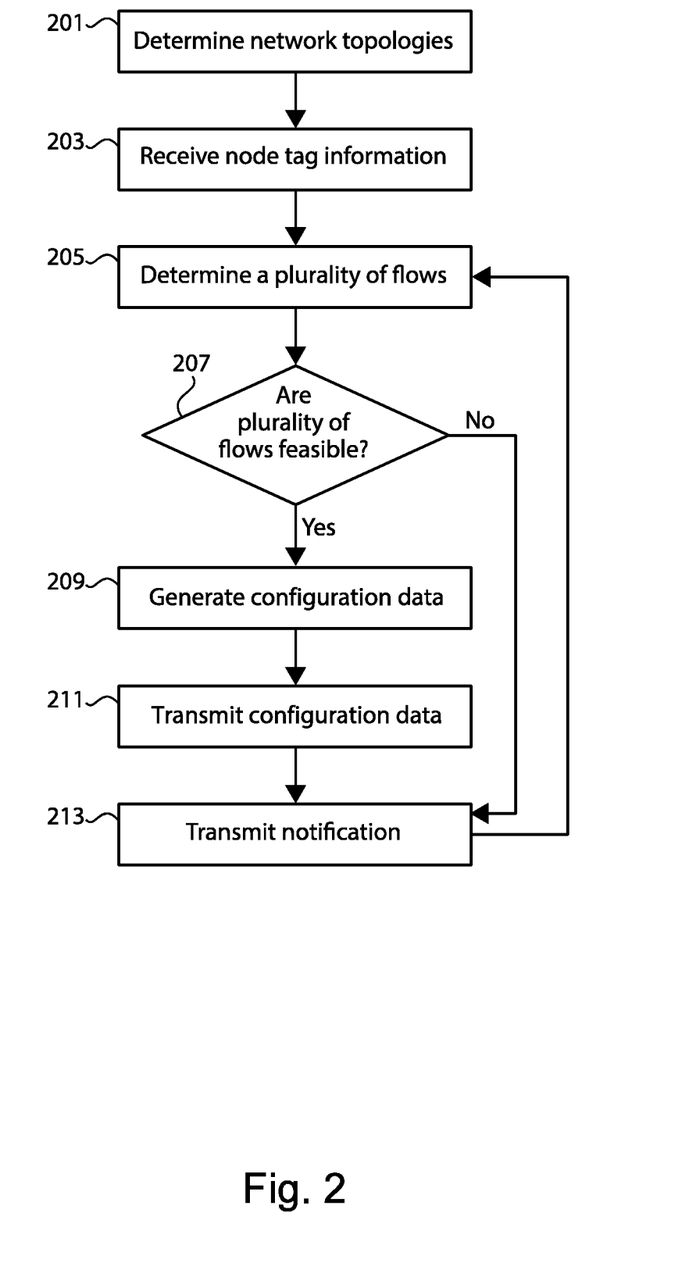
FIG. 2 is a flowchart illustrating an exemplary network configuration process.

With reference to FIG. 2, there is illustrated an exemplary process 200 for configuring a primary TSN and a redundant TSN, such as primary TSN 110 and redundant TSN 130 of system 100 in FIG. 1. Process 200 may be implemented in whole or in part in one or more of the control systems disclosed herein, such as control system 160 of system 100 in FIG. 1. In certain forms the primary TSN configuration and redundant TSN configuration functionalities may be performed by separate control systems. In certain forms, primary TSN configuration and redundant TSN configuration functionalities may be performed by the same control system. It shall be further appreciated that a number of variations and modifications to process 200 are contemplated including, for example, the omission of one or more aspects of process 200, the addition of further conditionals and operations, or the reorganization or separation of operations and conditionals into separate processes.

Process 200 begins at operation 201 where the control system determines the current network topologies of the primary TSN and the redundant TSN for use in subsequent steps of process 200, such as conditional 207 and operation 209. The control system begins by accessing the primary TSN topology database including information regarding the end nodes and network nodes of the primary TSN, and the redundant TSN topology database including information regarding the end nodes and network nodes of the redundant TSN. For the first iteration of operation 201, with the information from both databases, the control system generates base network topologies of the primary TSN and the redundant TSN. The information may include the address and the type of each node, to name but a few examples. In certain embodiments, the control system receives the base network topologies instead of accessing the topology databases or generating the network topology. For the first iteration of operation 201, the base network topologies are the current network topologies. For subsequent iterations of operation 201, the control system determines the current network topologies of the primary TSN and the redundant TSN by updating the most recent network topologies, such as the base network topologies, using the primary TSN database and the redundant TSN database.

The control system then verifies the network topology, correcting the network topology if the topology is deemed to be inaccurate. For example, the control system may verify the network topology by comparing the current network topology with a previously determined network topology or a design topology, to name but one example. In certain embodiments, correcting the network topology includes transmitting a notification to the user.

Process 200 proceeds to operation 203 where the control system receives tags, each including a defined variable related to inter-node communication. For example, a tag could relate to an output of a calculation such as calculated steam temperature. In another example, a tag could relate to an output from a sensor end node such as measured steam temperature. The tag includes a characteristics of the variable such as an alarm limit, maximum value, minimum value, or scan rate, to name but a few examples. The control system may receive tags by accessing a tag database to gather tags corresponding to end nodes and network nodes of the primary and redundant TSNs.

Process 200 proceeds to operation 205 where the control system determines a plurality of data flows. To determine the plurality of data flows, the control system first generates the plurality of data flows, then determines whether the plurality of data flows are feasible.

The control system generates the plurality of flows using the tag database and input from a user identifying desired primary and redundant flows. Input from the user may identify the end node, or source node, from which the data originates; the end node, or destination node, from which the data will be received; and the periodicity of packets in the data flow, to name but a few examples. The plurality of flows may be organized in a data structure, such as a flow table, so as to include all information necessary to establish deterministic communication between nodes.

In certain embodiments, each data flow is identified in the data structure by an identifier including the source and destination node addresses together with source and destination variable pointers. The pointers may be replaced by another type of location indicator. In certain embodiments, the bandwidth of each data flow is also included in the data structure as an attribute of each data flow. In certain embodiments, bandwidth may be defined as the periodicity multiplied by the maximum packet length and a scaling factor. In certain embodiments, a pointer or other type of location identifier to a duplicative flow is also included in the data structure as an attribute of each data flow.

The control system determines whether the plurality of data flows is feasible given the network constraints. Feasibility is determined using the plurality of flows and the network topologies determined in operation 201. First, the periodicities of the flows must be integer multiples of $$\frac{1}{\Delta t},$$

where $\Delta t$ is specified oy a user. Next, for one example of a feasibility test where bandwidth is the evaluated parameter, the control system determines the sum of the total bandwidths of the data flows and the total available bandwidth. If the sum of the bandwidths of the plurality of data flows exceeds the total available bandwidth of the primary TSN and redundant TSN, the plurality of flows is not feasible. The total available bandwidth is based on the nodes forming the path for the flow being tested for feasibility. If the sum of the bandwidths of the plurality of data flows does not exceed the total available bandwidth of the primary TSN or redundant TSN, the plurality of data flows is feasible.

Process 200 proceeds to conditional 207 where the control system determines whether the plurality of data flows is feasible. The control system may determine whether the plurality of data flows is feasible for the entire system, feasible for each individual node, or a combination thereof. If the plurality of flows is not feasible, process 200 proceeds to operation 213 where the control system transmits a notification to the user that the plurality of flows based on the user-specified parameters is not feasible given the network constraints. In certain embodiments, the control system may return to operation 205 and modify $\Delta t$ until the flows are feasible. The control system may modify $\Delta t$ by adjusting the value or by using multiple schedulers, each with a different $\Delta t$ value. The modification of the $\Delta t$ value will override the value specified by the user.

If the plurality of data flows is feasible, process 200 proceeds from conditional 207 to operation 209.

During operation 209, for each data flow, the control system generates a set of configuration information for each end node and network node of the primary and redundant TSNs. The control system uses the network topologies determined in operation 201 and the plurality of flows determined in operation 205. For example, in order to generate sets of configuration information for the network nodes, all flows having the same periodicity are grouped together. Flows may instead be group by another parameter other than periodicity. In certain embodiments where end nodes of one TSN are connected with the other TSN, the flows having the same periodicity may include the primary flows originating from a primary end node and redundant flows originating from a redundant end node. For each flow of the same periodicity, the control system determines a best flow, including a path formed by a sequence of network nodes connecting the source node to the destination node. The best path may be determined by metrics defined by a user. Then, the control system generates a set of configuration information for the source node, the destination node, and the network nodes of the best path for each flow. If more than one set of configuration information is generated for a given node, the sets of configuration information are combined.

In certain embodiments where end nodes of one TSN are connected with the other TSN, the sets of configuration information for network nodes identify duplicative flows. Network nodes forwarding primary and redundant data flows may process and forward the duplicative flows simultaneously. In response to a failure to process duplicative flows within a time frame, the control system may transmit a notification to a user.

With respect to generating sets of configuration information for the end nodes, flows may be grouped by a source node/destination node pair, periodicity, by data queue, or a combination thereof, to name but a few examples. The control system generates a set of configuration information for each end node according to the data flows the end node generates as a source node and receives as a destination node. Each set of configuration information includes the identifier and periodicity of each flow generated or received by the node.

In certain embodiments where source nodes and destination nodes of one TSN are connected with the other TSN, the set of configuration information may configure the source nodes to transmit a first data flow through one TSN and a duplicative flow through the other TSN, with the first data flow and the duplicative flow having a different identifier. In certain embodiments, the set of configuration information for each destination node includes flows identifying a duplicative flow.

Process 200 proceeds to operation 211 where the control system transmits each generated set of configuration information to the corresponding node effective to configure the corresponding node. The set of configuration information may be downloaded for each node. Where a gateway is used to communicate with a non-TSN device, the set of configuration information is downloaded to the gateway instead of the non-TSN device.

Process 200 proceeds to operation 213 where each newly configured node transmits a notification to the control system. After each end node and network node is configured, the configured node transmits a notification to the control system indicating a successful configuration. In other embodiments, operations 205-213 are completed first for the primary TSN, then process 200 returns to operation 205 and repeats operations for the redundant TSN.

Figure 3:
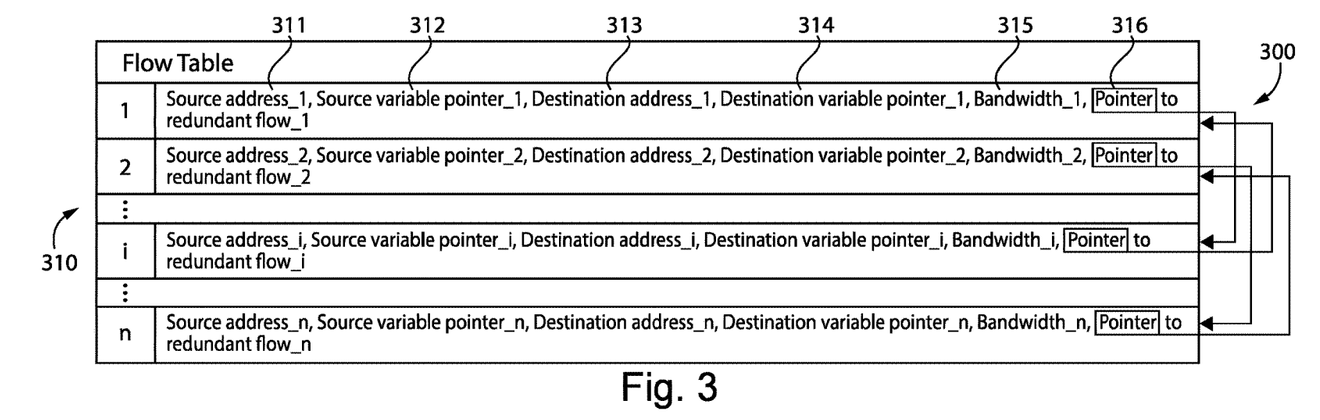
FIG. 3 is a table illustrating an exemplary flow table.

With reference to FIG. 3, there is an exemplary flow table 300, such as the flow table used in operation 205 in the exemplary configuration process illustrated in FIG. 2. It shall be appreciated that the illustrated flow table is a graphical representation of a set of variables or tags used by an exemplary control system during the execution of an exemplary configuration process. The flow table is generated by a control system using tags from the tag database and user-specified primary and redundant data flows. Table 300 includes a plurality of rows 310, one row for each data flow to be configured in the primary TSN and redundant TSN. Each data flow row in table 300 includes characteristics of the data flow. For example, the first row includes an identifier including a sender address 311, sender parameter address 312, receiver address 313, and a receiver parameter address 314, as well as data flow attributes such as data rate 315 and redundant flow pointer 316. Sender parameter address 312 and receiver parameter address 314 may include timing information for the corresponding node. Using redundant flow pointer 316, a network node determines the primary data flow or redundant data flow with duplicative data. For example, the first row corresponds to a data flow duplicative of the data flow of row i. In certain embodiments, a flow table may include additional characteristics.

Figure 4:
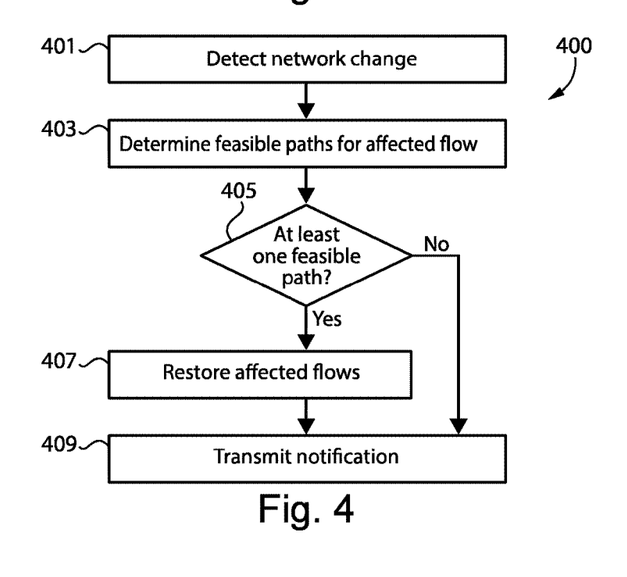
FIG. 4 is a flowchart illustrating an exemplary fault response process.

With reference to FIG. 4, there is illustrated an exemplary process 400 for dynamically re-configuring a primary TSN and redundant TSN of an exemplary industrial automation system, such as primary TSN 110 and redundant TSN 130 of system 100 in FIG. 1, in response to a change in the communication network. A change may be the result of a network failure, removal of a node, or the addition of a node, to name but a few examples. The source of a network failure may be a network node, an end node, or a communication channel. Network failures may be temporary or permanent, and may be caused by a malfunction or power loss, to name but a few examples. Process 400 may be implemented in whole or in part in one or more of the control systems disclosed herein, such as control system 160 in system 100 of FIG. 1. In certain forms the primary TSN configuration and redundant TSN configuration functionalities may be performed by separate control systems. In certain forms primary TSN configuration and redundant TSN configuration functionalities may be performed by the same control system. It shall be further appreciated that a number of variations and modifications to process 400 are contemplated including, for example, the omission of one or more aspects of process 400, the addition of further conditionals and operations, or the reorganization or separation of operations and conditionals into separate processes.

Process 400 begins at operation 401 where a control system detects a network change, such as a network communication prerequisite change, affecting a configured data flow. In certain embodiments, a network change affects a plurality of data flows and the following operations and conditional are executed for each affected data flow.

Process 400 proceeds to operation 403 where the control system attempts to determine alternative paths for the data flow affected by the network change. For example, where primary and redundant networks are interconnected by inter-network communication channels, an alternative path for a data flow affected by a primary TSN network node failure may include network nodes of the redundant TSN, such that a primary data flow is transmitted from a primary TSN end node to another primary TSN end node through the redundant TSN network nodes in addition to the duplicative data flow transmitted from the redundant TSN end node through the redundant TSN network nodes. In certain embodiments, the alternative path may include at least one primary TSN network node and at least one redundant TSN network node.

To qualify as an alternative path, the path must be feasible and must not adversely affect the already established flows. If the control system determines a single alternative path, the path will be used to restore the affected data flow. If the control system determines more than one alternative path, the control system selects the best alternative path. In certain embodiments, the best alternative path is selected based on user-defined parameters. For example, the user-defined parameters may include minimizing the number of network nodes used to communicate between the source node and the end node, to give but one example.

Process 400 proceeds to conditional 405. If the control system did not determine an acceptable alternative path, process 400 proceeds to operation 409 where the control system notifies the user of the error. If the control system determined an alternative path, process 400 proceeds to operation 407 where the primary TSN and redundant TSN are reconfigured to transmit the affected data flow using the alternative path. Process 400 then proceeds to operation 409 where the control system transmits a notification to the user indicating a successful reconfiguration.

Further written description of a number of exemplary embodiments shall now be provided. One embodiment is an industrial automation system comprising: a primary time-sensitive network (TSN) including a first plurality of end nodes and a first plurality of network nodes interconnected by a first plurality of communication channels and arranged in a first TSN topology; a redundant TSN including a second plurality of end nodes duplicative of the first plurality of end nodes and a second plurality of network nodes duplicative of the first plurality of network nodes, the second plurality of end nodes and the second plurality of network nodes being interconnected by a second plurality of communication channels and arranged in a second TSN topology identical to the first TSN topology; and a control system in communication with the primary TSN and the redundant TSN and configured to: determine a primary data flow, determine a redundant data flow duplicative of the primary data flow, generate a plurality of sets of configuration information using the primary data flow and the redundant data flow, and transmit the plurality of sets of configuration information to the first plurality of end nodes, the second plurality of end nodes, the first plurality of network nodes, and the second plurality of network nodes, wherein the primary TSN and the redundant TSN, using the plurality of sets of configuration information, are configured to transmit the primary data flow and the redundant data flow simultaneously.

In certain embodiments of the foregoing system, the primary TSN and the redundant TSN operate according to IEEE standard 802.1Q. In certain forms, the primary data flow includes a first path including a first end node of the first plurality of end nodes, a second end node of the first plurality of end nodes, and a first portion of the first plurality of network nodes connecting the first end node and the second end node; wherein the redundant data flow includes a second path including a third end node of the second plurality of end nodes, a fourth end node of the second plurality of end nodes, and a second portion of the second plurality of network nodes connecting the third end node and the fourth end node; and wherein the third end node is duplicative of the first end node, the fourth end node is duplicative of the second end node, and the second portion is duplicative of the first portion. In certain forms, determining the primary data flow includes generating the primary data flow using the first TSN topology and a tag database including a plurality of tags, each tag corresponding to one of the first plurality of network nodes. In certain forms, determining the primary data flow includes determining a periodicity of the primary data flow is an integer multiple of $1/\Delta t$, where $\Delta t$ is either specified by a user, or modified by the control system in response to determining an initial primary data flow is not feasible. In certain forms, a first end node of the first plurality of end nodes is connected to a first network node of the second plurality of network nodes. In certain forms, the control system is configured to detect a change in the first plurality of network nodes and determine an alternative path for the primary data flow in response to detecting the change, wherein the alternative path includes a portion of the second plurality of network nodes.

Another exemplary embodiment is a method for operating an industrial automation system comprising: operating a primary time-sensitive network (TSN) including a first plurality of end nodes and a first plurality of network nodes interconnected by a first plurality of communication channels and arranged in a first TSN topology; operating a redundant TSN including a second plurality of end nodes duplicative of the first plurality of end nodes and a second plurality of network nodes duplicative of the first plurality of network nodes, the second plurality of end nodes and the second plurality of network nodes being interconnected by a second plurality of communication channels and arranged in a second TSN topology identical to the first TSN topology; determining a primary data flow; determining a redundant data flow duplicative of the primary data flow; generating a plurality of configuration information using the primary data flow and the redundant data flow; transmitting the plurality of configuration information to the first plurality of end nodes, the second plurality of end nodes, the first plurality of network nodes, and the second plurality of network nodes; and transmitting, using the primary TSN and the redundant TSN, the primary data flow and the redundant data flow simultaneously.

In certain forms of the foregoing method, the primary TSN and the redundant TSN operate according to IEEE standard 802.1Q. In certain forms, the primary data flow includes a first path including a first end node of the first plurality of end nodes, a second end node of the first plurality of end nodes, and a first portion of the first plurality of network nodes connecting the first end node and the second end node; wherein the redundant data flow includes a second path including a third end node of the second plurality of end nodes, a fourth end node of the second plurality of end nodes, and a second portion of the second plurality of network nodes connecting the third end node and the fourth end node; and wherein the third end node is duplicative of the first end node, the fourth end node is duplicative of the second end node, and the second portion is duplicative of the first portion. In certain forms, determining the primary data flow includes generating the primary data flow using the first TSN topology and a tag database including a plurality of tags, each tag corresponding to one of the first plurality of network nodes. In certain forms, determining a periodicity of the primary data flow is an integer multiple of $1/\Delta t$, where $\Delta t$ is either specified by a user, or modified by a control system in response to determining an initial primary data flow is not feasible. In certain forms, a first end node of the first plurality of end nodes is connected to a first network node of the second plurality of network nodes. In certain forms, the method comprises detecting a change in the first plurality of network nodes; and determining an alternative path for the primary data flow in response to detecting the change, wherein the alternative path includes the first end node and a portion of the second plurality of network nodes.

A further exemplary embodiment is a control system for an industrial automation system including a primary time-sensitive network (TSN) including a first plurality of end nodes and a first plurality of network nodes interconnected by a first plurality of communication channels and arranged in a first TSN topology, and a redundant TSN including a second plurality of end nodes duplicative of the first plurality of end nodes and a second plurality of network nodes duplicative of the first plurality of network nodes, the second plurality of end nodes and the second plurality of network nodes being interconnected by a second plurality of communication channels and arranged in a second TSN topology identical to the first TSN topology, the control system comprising: a memory device structured to store a set of instructions; and a processor structured to execute the set of instructions effective to: determine a primary data flow, determine a redundant data flow duplicative of the primary data flow, generate a plurality of configuration information sets using the primary data flow and the redundant data flow, and transmit the plurality of configuration information sets to the first plurality of end nodes, the second plurality of end nodes, the first plurality of network nodes, and the second plurality of network nodes, wherein transmitting the plurality of configuration information sets is effective to cause the primary data flow and the redundant data flow to be transmitted through the industrial automation system simultaneously.

In certain forms of the foregoing control system the primary TSN and the redundant TSN operate according to IEEE standard 802.1Q. In certain forms, the primary data flow includes a first path including a first end node of the first plurality of end nodes, a second end node of the first plurality of end nodes, and a first portion of the first plurality of network nodes connecting the first end node and the second end node; wherein the redundant data flow includes a second path including a third end node of the second plurality of end nodes, a fourth end node of the second plurality of end nodes, and a second portion of the second plurality of network nodes connecting the third end node and the fourth end node; and wherein the third end node is duplicative of the first end node, the fourth end node is duplicative of the second end node, and the second portion is duplicative of the first portion. In certain forms, determining the primary data flow includes generating the primary data flow using the first TSN topology and a tag database including a plurality of tags, each tag corresponding to one of the first plurality of network nodes. In certain forms, determining a periodicity of the primary data flow is an integer multiple of $1/\Delta t$, where $\Delta t$ is either specified by a user, or modified by the control system in response to determining an initial primary data flow is not feasible. In certain forms, a first end node of the first plurality of end nodes is connected to a first network node of the second plurality of network nodes, wherein the control system is configured to detect a change in the first plurality of network nodes and determine an alternative path for the primary data flow in response to detecting the change, and wherein the alternative path includes a portion of the second plurality of network nodes.

It is contemplated that the various aspects, features, processes, and operations from the various embodiments may be used in any of the other embodiments unless expressly stated to the contrary. Certain operations illustrated may be implemented by a computer including a processing device executing a computer program product on a non-transient, computer-readable storage medium, where the computer program product includes instructions causing the processing device to execute one or more of the operations, or to issue commands to other devices to execute one or more operations.

While the present disclosure has been illustrated and described in detail in the drawings and foregoing description, the same is to be considered as illustrative and not restrictive in character, it being understood that only certain exemplary embodiments have been shown and described, and that all changes and modifications that come within the spirit of the present disclosure are desired to be protected. It should be understood that while the use of words such as "preferable," "preferably," "preferred" or "more preferred" utilized in the description above indicate that the feature so described may be more desirable, it nonetheless may not be necessary, and embodiments lacking the same may be contemplated as within the scope of the present disclosure, the scope being defined by the claims that follow. In reading the claims, it is intended that when words such as "a," "an," "at least one," or "at least one portion" are used there is no intention to limit the claim to only one item unless specifically stated to the contrary in the claim. The term "of" may connote an association with, or a connection to, another item, as well as a belonging to, or a connection with, the other item as informed by the context in which it is used. The terms "coupled to," "coupled with" and the like include indirect connection and coupling, and further include but do not require a direct coupling or connection unless expressly indicated to the contrary. When the language "at least a portion" and/or "a portion" is used, the item can include a portion and/or the entire item unless specifically stated to the contrary.

What is claimed is:

1. An industrial automation system comprising:
 a primary time-sensitive network (TSN) including a first plurality of end nodes and a first plurality of network nodes interconnected by a first plurality of communication channels and arranged in a first TSN topology;
 a redundant TSN including a second plurality of end nodes duplicative of the first plurality of end nodes and a second plurality of network nodes duplicative of the first plurality of network nodes, the second plurality of end nodes and the second plurality of network nodes being interconnected by a second plurality of communication channels and arranged in a second TSN topology identical to the first TSN topology; and
 a control system in communication with the primary TSN and the redundant TSN and configured to:
  determine a plurality of data flows including a primary data flow and a redundant data flow duplicative of the primary data flow by generating the plurality of data flows in response to input from a user and determining whether the plurality of data flows is feasible based on bandwidth constraints of the primary TSN and the redundant TSN,
  generate a plurality of sets of configuration information using the primary data flow and the redundant data flow, and
  transmit each of the plurality of sets of configuration information to corresponding ones of the first plurality of end nodes, the second plurality of end nodes, the first plurality of network nodes, and the second plurality of network nodes, wherein the primary TSN and the redundant TSN, using the plurality of sets of configuration information, are configured to transmit the primary data flow and the redundant data flow simultaneously.

2. The industrial automation system of claim 1, wherein the primary TSN and the redundant TSN operate according to IEEE standard 802.1Q.

3. The industrial automation system of claim 1, wherein the primary data flow includes a first path including a first end node of the first plurality of end nodes, a second end node of the first plurality of end nodes, and a first portion of the first plurality of network nodes connecting the first end node and the second end node; wherein the redundant data flow includes a second path including a third end node of the second plurality of end nodes, a fourth end node of the second plurality of end nodes, and a second portion of the second plurality of network nodes connecting the third end node and the fourth end node; and wherein the third end node is duplicative of the first end node, the fourth end node is duplicative of the second end node, and the second portion is duplicative of the first portion.

4. The industrial automation system of claim 1, wherein determining the primary data flow includes generating the primary data flow using the first TSN topology and a tag database including a plurality of tags, each tag corresponding to one of the first plurality of network nodes.

5. The industrial automation system of claim 4, wherein determining the primary data flow includes determining a periodicity of the primary data flow is an integer multiple of 1/Δt, where Δt is either specified by a user, or modified by the control system in response to determining an initial primary data flow is not feasible.

6. The industrial automation system of claim 1, wherein a first end node of the first plurality of end nodes is connected to a first network node of the second plurality of network nodes.

7. The industrial automation system of claim 6, wherein the control system is configured to detect a change in the first plurality of network nodes and determine an alternative path for the primary data flow in response to detecting the change, wherein the alternative path includes a portion of the second plurality of network nodes.

8. A method for operating an industrial automation system comprising:
operating a primary time-sensitive network (TSN) including a first plurality of end nodes and a first plurality of network nodes interconnected by a first plurality of communication channels and arranged in a first TSN topology;
operating a redundant TSN including a second plurality of end nodes duplicative of the first plurality of end nodes and a second plurality of network nodes duplicative of the first plurality of network nodes, the second plurality of end nodes and the second plurality of network nodes being interconnected by a second plurality of communication channels and arranged in a second TSN topology identical to the first TSN topology;
determining a plurality of data flows including a primary data flow and a secondary data flow duplicative of the primary data flow by generating the plurality of data flows in response to input from a user and determining whether the plurality of data flows is feasible based on bandwidth constraints of the primary TSN and the redundant TSN;
generating a plurality of configuration information using the primary data flow and the redundant data flow;
transmitting each of the plurality of configuration information to corresponding ones of the first plurality of end nodes, the second plurality of end nodes, the first plurality of network nodes, and the second plurality of network nodes; and
transmitting, using the primary TSN and the redundant TSN, the primary data flow and the redundant data flow simultaneously.

9. The method of claim 8, wherein the primary TSN and the redundant TSN operate according to IEEE standard 802.1Q.

10. The method of claim 8, wherein the primary data flow includes a first path including a first end node of the first plurality of end nodes, a second end node of the first plurality of end nodes, and a first portion of the first plurality of network nodes connecting the first end node and the second end node; wherein the redundant data flow includes a second path including a third end node of the second plurality of end nodes, a fourth end node of the second plurality of end nodes, and a second portion of the second plurality of network nodes connecting the third end node and the fourth end node; and wherein the third end node is duplicative of the first end node, the fourth end node is duplicative of the second end node, and the second portion is duplicative of the first portion.

11. The method of claim 8, wherein determining the primary data flow includes generating the primary data flow using the first TSN topology and a tag database including a plurality of tags, each tag corresponding to one of the first plurality of network nodes.

12. The method of claim 11, wherein determining a periodicity of the primary data flow is an integer multiple of 1/Δt, where Δt is either specified by a user, or modified by a control system in response to determining an initial primary data flow is not feasible.

13. The method of claim 8, wherein a first end node of the first plurality of end nodes is connected to a first network node of the second plurality of network nodes.

14. The method of claim 13, comprising:
detecting a change in the first plurality of network nodes; and
determining an alternative path for the primary data flow in response to detecting the change,
wherein the alternative path includes the first end node and a portion of the second plurality of network nodes.

15. A control system for an industrial automation system including a primary time-sensitive network (TSN) including a first plurality of end nodes and a first plurality of network nodes interconnected by a first plurality of communication channels and arranged in a first TSN topology, and a redundant TSN including a second plurality of end nodes duplicative of the first plurality of end nodes and a second plurality of network nodes duplicative of the first plurality of network nodes, the second plurality of end nodes and the second plurality of network nodes being interconnected by a second plurality of communication channels and arranged in a second TSN topology identical to the first TSN topology, the control system comprising:
a memory device structured to store a set of instructions; and
a processor structured to execute the set of instructions effective to:
determine a plurality of data flows including a primary data flow and a redundant data flow duplicative of the primary data flow by generating the plurality of data flows in response to input from a user and determining whether the plurality of data flows is feasible based on bandwidth constraints of the primary TSN and the redundant TSN,
generate a plurality of configuration information sets using the primary data flow and the redundant data flow, and
transmit each of the plurality of configuration information sets to corresponding ones of the first plurality of end nodes, the second plurality of end nodes, the first plurality of network nodes, and the second plurality of network nodes,
wherein transmitting the plurality of configuration information sets is effective to cause the primary data flow and the redundant data flow to be transmitted through the industrial automation system simultaneously.

16. The control system of claim 15, wherein the primary TSN and the redundant TSN operate according to IEEE standard 802.1Q.

17. The control system of claim 15, wherein the primary data flow includes a first path including a first end node of the first plurality of end nodes, a second end node of the first plurality of end nodes, and a first portion of the first plurality of network nodes connecting the first end node and the second end node; wherein the redundant data flow includes a second path including a third end node of the second plurality of end nodes, a fourth end node of the second plurality of end nodes, and a second portion of the second plurality of network nodes connecting the third end node and the fourth end node; and wherein the third end node is duplicative of the first end node, the fourth end node is duplicative of the second end node, and the second portion is duplicative of the first portion.

18. The control system of claim 15, wherein determining the primary data flow includes generating the primary data flow using the first TSN topology and a tag database including a plurality of tags, each tag corresponding to one of the first plurality of network nodes.

19. The control system of claim 18, wherein determining a periodicity of the primary data flow is an integer multiple of $1/\Delta t$, where $\Delta t$ is either specified by a user, or modified by the control system in response to determining an initial primary data flow is not feasible.

20. The control system of claim 15, wherein a first end node of the first plurality of end nodes is connected to a first network node of the second plurality of network nodes, wherein the control system is configured to detect a change in the first plurality of network nodes and determine an alternative path for the primary data flow in response to detecting the change, and wherein the alternative path includes a portion of the second plurality of network nodes.

* * * * *